Feb. 15, 1927.

N. JAPOLSKY ET AL 1,617,394

ELECTRIC DRIVING INSTALLATION

Filed Oct. 16, 1922

N. Japolsky & M. Kostenko

INVENTORS

By: Marks & Clark
ATTYS

Patented Feb. 15, 1927.

1,617,394

UNITED STATES PATENT OFFICE.

NICOLAS JAPOLSKY AND MICHAEL KOSTENKO, OF LONDON, ENGLAND.

ELECTRIC DRIVING INSTALLATION.

Application filed October 16, 1922, Serial No. 595,003, and in Switzerland, March 21, 1922.

This invention relates to electric driving installations and its main object is to provide a form of drive which shall permit of the use of the simplest type of motor while providing for the complete and effective control of its speed and power, so that the motor can be arranged where the space available is very small as for driving ships' propellers, and power rollers.

An alternating current motor is used, and this is supplied with its full driving current by a generator, which is adapted to be driven at constant speed and to provide the whole power required, while permitting its frequency and voltage to be varied. For this purpose, the generator is constituted by an alternating current commutator machine in which the stator and rotor main power currents are arranged, one with a continuous winding, and the other with a discontinuous winding, the various power phases of the alternating current motor being connected across the gaps of this discontinuous winding in order to obtain neutralization of the stator and rotor main power currents under the best conditions, and the magnetic field of said generator being wholly provided by an exciting current from a separate exciting machine, which is provided with means whereby its frequency may be controlled.

In order that the invention may be better understood, reference will now be made to the accompanying diagrammatic drawings in which:—

Figure 1:
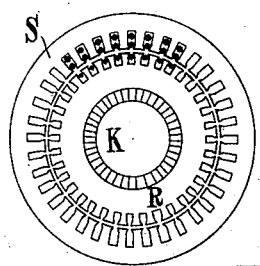
Fig. 1 is a cross section of the stator and rotor of the commutator generator.

The alternating-current commutator-generator herewith proposed (which in the following description will be referred to as a commutator-generator) is composed, as shown in Fig. 1, of stator S with non-salient poles, and rotor R, with its commutator K.

Figure 3:
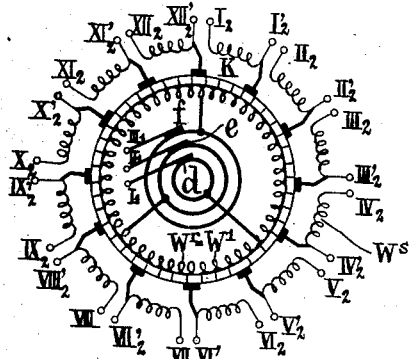
Fig. 3 shows a modification of the commutator generator with excitation current fed to the rotor, using the rotor power winding at the same time in the capacity of exciting winding.
Figure 2:
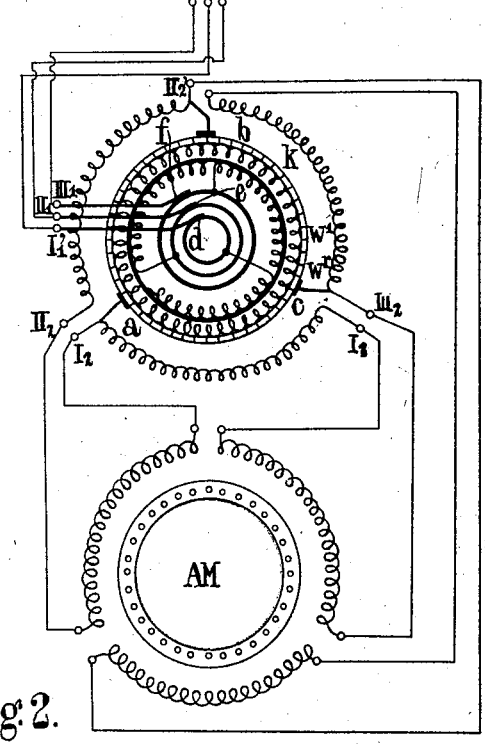
Fig. 2 shows an arrangement comprising an asynchronous motor, fed from a commutator generator, having a separate winding on the rotor with which a synchronous exciter is connected.

In Fig. 2, a primary exciter-winding $W^1$ is distributed on the rotor, but alternatively the exciting current can be passed through part of the working or power windings $W^s$ and $W^r$; for instance, scheme Fig. 3 shows a case of a three-phase exciting current in which the 12 phase rotor-winding $W^r$ is used as exciter-winding. The exciter-winding is in both schemes provided with its outer terminals $I_1$, $II_1$, $III_1$, and also with the sliding brushes $d—e—f$. This exciter winding is fed with alternating current at variable frequency which is furnished by a separate generator.

The working winding is distributed on the stator as well as on the rotor, the winding part $W^s$ distributed on the stator (see Figs. 2 and 3), consisting of separate parts having terminals at each end $I_2$, $I'_2$, $II_2$, $II'_2$, etc., whilst the other winding-part $W^r$, distributed on the rotor, is connected with the commutator K. The stator winding $W^s$ and the rotor winding $W^r$ are connected at electrically corresponding points with each other by means of brushes ($a—b—c$ in Fig. 2). If in this case the actual number of turns $f^s$ of the stator $W^s$ is made equal to the actual number of turns $f^r$ of the rotor $W^r$, the result is that their mutual effect is neutralized (if the small leakage is disregarded, as it can be compensated by the respective shifting of the brushes) and these two windings $W^r$ and $W^s$ will not coact with the exciter-winding as is the case with windings in a transformer.

In this way there may be obtained a compensated commutator-generator, the total power taken from which generator, as well as the mechanical and the copper losses, are to be furnished by its driving machine, whilst the iron-losses alone are to be provided by an alternating current exciter WE. Thus the exciter can be kept small in relation to the commutator generator, and therefore its speed can be easily regulated.

The voltage of the commutator generator depends, as in other generators, on the exciting current and the speed of rotation, but the frequency of the commutator generator is determined by the frequency of its exciting field. When the commutator generator is excited from its stator, its frequency is equal to the frequency of the exciting current. When the generator is excited from the rotor its frequency is equal to the algebraic sum of two frequencies, namely, the frequency of the exciting current, and the frequency corresponding to the speed of the generator.

In both cases, at a constant speed of the generator, its frequency can be easily changed by changing the frequency of the exciting current i. e. by changing the speed of the exciter.

The exciter WE is also adapted to have its voltage controlled.

If the right choice is made of the relation between the frequency of the alternating current exciter WE and its voltage, then all the desired graduations between the turning moments of the asynchronous-motor can be obtained at the start and at the normal speed.

The driving motor of the alternating-current exciter may be of any kind, provided its speed can be easily varied.

The exciter winding may be arranged to have the same or a different number of phases to the working winding. In Fig. 2 the exciting current is brought through slip rings to a separate winding $W_1$, said winding being arranged in star connection to a neutral point.

The outside current which is utilized to drive the motor AM is brought to the machine by the terminals $I_2$ $III^1_2$, $III_2$ $II^1_2$, $II_2$ $I^1_2$. That is to say the three windings on the alternating current motor are arranged completely separate from one another, thus having six terminals, and the terminals of these windings are connected respectively to $I_2$ $III^1_2$ etc.

With this form of connection, it is possible to arrange that the rotor and stator currents exactly counterbalance one another at each point of the circumference of the machine, there being perfect symmetry between the windings. In Fig. 3 the motor is to be connected in the same way, being wound with twelve phases all electrically separate, and each connected at their terminals between one of the gaps $I_2$ $XII^1_2$ etc.

In this figure the same winding on the rotor is utilized both for the working current and for the exciting current. The exciting current is, however, supplied by three terminals instead of twelve.

Of course, from the described commutator-generator may be fed, instead of the asynchronous-motor, any other motor with alternating current of variable frequency, for instance a synchronous-motor.

What we claim is:—

An electric driving installation, comprising an alternating current motor, an alternating current commutator generator having stator and rotor elements, a continuous winding on one of these elements, and a corresponding discontinuous winding on the other element extending over its whole circumference but divided electrically by gaps into separate parts, means for driving said generator at constant speed, excitation means on said generator, an exciting machine for supplying alternating current to said excitation means, and means for controlling the frequency of such alternating current, power windings on the alternating current motor, leads connecting these power windings across the respective gaps between the separate parts of the discontinuous winding, and brushes connecting electrically corresponding points of the stator winding and rotor compensating winding of the generator, whereby the magnetic effects of the stator and rotor currents of the generator neutralize one another.

In testimony whereof we affix our signatures.

NICOLAS JAPOLSKY.
MICHAEL KOSTENKO.